Dec. 29, 1953

R. T. NAKASONE 2,664,531

MOTOR CONTROL CIRCUIT

Filed March 18, 1952

INVENTOR:
Robert P. Nakasone,
BY
E. S. Borth,
ATTORNEY.

Patented Dec. 29, 1953

2,664,531

UNITED STATES PATENT OFFICE 2,664,531

MOTOR CONTROL CIRCUIT

Robert T. Nakasone, Chicago, Ill., assignor, by mesne assignments, to Barber-Colman Company, Rockford, Ill., a corporation of Illinois Application March 18, 1952, Serial No. 277,129

7 Claims. (Cl. 318—31)

This invention relates to motor control circuits, and more particularly to a braking circuit for a reversible two phase motor.

Reversible two phase motors are used very extensively in indicating recording and control instruments to drive pointers, pens or control devices. It is essential in instruments of this type that the motor be brought to a quick stop when the instrument reaches the desired position to prevent coasting which might result in overshooting and hunting. Various types of braking mechanisms have been provided for this purpose but all have been relatively complex and expensive.

It is accordingly one of the objects of the present invention to provide a motor control circuit in which the motor is supplied with braking current through a very simple and inexpensive circuit arrangement as soon as operating current is cut off or reaches a minimum value. Another object is to provide a motor control circuit in which the supply of braking current is controlled in response to the presence or absence of operating voltage in the control winding of the motor.

According to one feature oppositely poled rectifiers are connected across the control winding of the motor and through a common impedance element to the mid-point of a transformer winding which supplies the motor control winding. An electron discharge tube is controlled by the voltage drop across the impedance element and functions to produce braking current in one of the motor windings. A further object of the invention is to provide a motor control circuit in which the braking current is produced by an electron discharge tube connected directly across the motor main winding.

A still further object is to provide a motor control circuit in which the braking current is produced by shunting a condenser connected in series with the motor main winding through an electron discharge tube.

Figure 1:
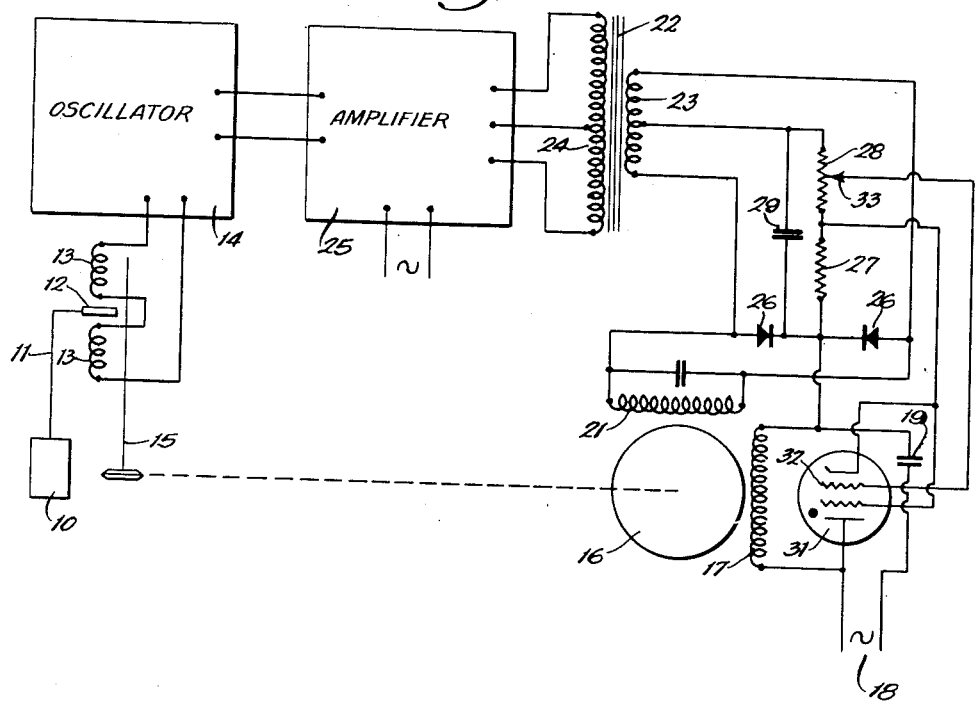
Figure 2:
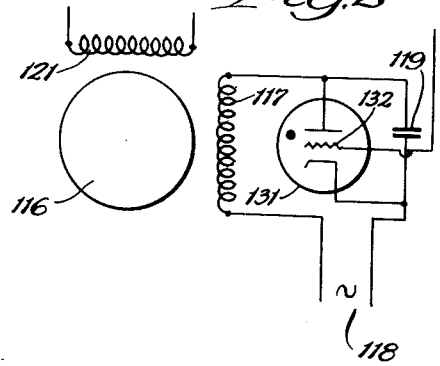

The above and other objects and features of the invention will be more readily apparent from the following description when read in connection with the accompanying drawing in which Figure 1 is a circuit diagram of a motor control circuit embodying the invention, and Figure 2 is a partial diagram illustrating a modified circuit construction.

The invention is illustrated in connection with a recording or controlling instrument which includes a device 10 responsive to a condition to be recorded or controlled having a pointer 11 pivoted therein and moved thereby in response to changes in the condition. The device 10 may be a millivolt meter, a galvanometer, or any other desired type of condition responsive unit which will produce a pointer movement. The pointer carries a metallic flag 12 movable between a pair of coils 13 which are connected in the turning circuit of an oscillator 14. This construction may be of the type more particularly described and claimed in the patent to Cohen No. 2,527,797.

The coils 13 are mounted on a lever 15 which is pivoted coaxially with the pointer 11 and which is connected to the rotor 16 of a reversible two phase motor. The motor is of the usual two phase type including a main winding 17 connected to an alternating current source indicated at 18, and having a condenser 19 in series therewith to shift the phase of the main winding voltage 90°. A control winding 21 is provided for the motor which is adapted to be supplied with a voltage which leads or lags the voltage across the main winding to cause the motor to turn in one direction or the other.

The control winding is supplied with current through a transformer 22 having a secondary winding 23 connected directly across the control winding 21 and having a center tapped primary winding 24. The primary winding is supplied with voltage from an amplifier 25 which is controlled by the oscillator 14 so that one section or the other of the primary winding will be energized depending upon whether the flag 12 moves further into or further out of the coils 13. When the flag 12 occupies a predetermined neutral position relative to the coils, the sections of the primary winding 24 will be equally energized so that no secondary voltage will be present.

With the construction as so far described, whenever the flag 12 moves relative to the coils the motor control winding 21 will be energized with a voltage of one phase or the other to turn the motor rotor 16 in a direction to move the coils 13 to follow the movement of the flag 12. Thus, the motor 16 will always occupy a position corresponding to the position of the pointer 11 and it can be utilized to operate a recording or control device as desired.

To prevent the motor from coasting past the desired position when a balance is reached a braking circuit is provided to supply braking current to one of the motor winding. As shown, the braking circuit comprises a pair of rectifiers 26 connected in series in oppositely poled relationship across the transformer secondary winding 23. The point between the rectifiers 26 is connected through a pair of series resistors 27 and 28 to a center tap on the secondary winding 23. Preferably a condenser 29 is connected in parallel with the resistors 27 and 28 to dampen out pulsations in the direct current flowing therethrough. The total impedance of these rectifier and resistance combinations looking into the amplifier output is relatively high to prevent initial damping of the motor.

In the construction shown in Figure 1, an electron discharge tube 31 which is preferably a gas tube, has its anode connected to one side of the main winding 17 and has its cathode connected through the resistor 27 to the opposite side of the main winding. The tube includes a control grid 32 which is connected to a wiper 33 engaging the resistor 26 so that an adjustable bias can be applied to the tube grid proportional to the voltage drop across the resistor 28.

When there is no voltage in the secondary winding 23 or when the voltage therein is below a predetermined minimum value there will be no flow of current through the resistor 28 and the control grid and cathode of the tube 31 will be at substantially the same potential. At this time the tube 31 will conduct to shunt current from one side of the main winding through the tube and through the resistor 27 to the opposite side of the main winding.

The tube at this time shunts one half of the alternating current voltage applied to the main winding so that the main winding has produced therein a direct or pulsating uni-directional current which will function as a braking current to resist turning of the rotor 16. When the transformer secondary winding 23 is energized current will flow through one or the other of the rectifiers 26 and on alternate half cycle and through the resistor 28 to produce a negative bias on the tube control grid 32 which will bias the tube to cut off. Under this high tube impedance condition no current flows through the tube circuit so that the motor can function in the usual manner. As soon, however, as the control or operating voltage for the motor is removed by returning of the system to a balanced condition, the braking current will become effective to stop the motor quickly and to hold it against accidental movement.

Instead of connecting the tube across the motor main winding as shown in Figure 1, it can be connected as shown in Figure 2 wherein parts corresponding to like parts in Figure 1 are indicated by the same reference numerals plus 100. In this arrangement, the tube 131 is connected directly across the condenser 119, it being understood that the remainder of the circuit is the same as in Figure 1. Therefore, when the tube conducts a heavy pulsating D. C. component of current flows through winding 117 which effectively dampens the motor.

In both embodiments illustrated, the braking current is produced by the electron discharge tube which, in turn, is controlled by the voltage across the motor control winding so that the braking effect will be produced immediately when voltage disappears from the motor control winding and will be eliminated as soon as operating voltage is present in the motor control winding. The circuit therefore functions rapidly and efficiently to brake the motor when braking is desired and to eliminate the braking when it is desired that the motor shall operate. This operation is produced very simply with a minimum of apparatus and with a minimum of expense, and most important is improvement of the type of control circuit controlling the motor. In other words, the control or sensing signal is supplied from the same source of voltage used to power the control phase winding of any two phase motor.

While one embodiment of the invention has been shown and described in detail, it will be understood that this is illustrative only and is not to be taken as a definition of the scope of the invention, reference being had for this purpose to the appended claims.

What is claimed is:

1. A control circuit for a reversible motor having a main winding and a control winding supplied with alternating currents whose phase relationship determines the direction of rotation of the motor, said control circuit comprising a supply circuit connected to the control winding to supply alternating current of reversed phases thereto, a pair of rectifiers connected in series across the supply circuit and reversely poled, a resistor connecting the point between the rectifiers to a mid-point in the supply circuit, and an electron discharge tube controlled by the voltage drop across the resistor and connected to one of the motor windings to produce a braking current therein when there is no flow of current through the resistor.

2. A control circuit for a reversible motor having a main winding and a control winding supplied with alternating currents whose phase relationship determines the direction of rotation of the motor, said control circuit comprising a supply circuit connected to the control winding to supply alternating current of reversed phases thereto, a pair of rectifiers connected in series across the supply circuit and reversely poled, a resistor connecting the point between the rectifiers to a mid-point in the supply circuit, and an electron discharge tube connected across the motor main winding and connected to the resistor to be controlled in response to the voltage drop across the resistor.

3. A control circuit for a reversible motor having a main winding and a control winding supplied with alternating currents whose phase relationship determines the direction of rotation of the motor, said control circuit comprising a supply circuit connected to the control winding to supply alternating current of reversed phases thereto, a pair of rectifiers connected in series across the supply circuit and reversely poled, a resistor connecting the point between the rectifiers to a mid-point in the supply circuit, a condenser in series with the main winding, and an electron discharge tube controlled by the voltage drop across the resistor and connected across the condenser.

4. A control circuit for a reversible motor having a main winding and a control winding supplied with alternating currents whose phase relationship determines the direction of rotation of the motor comprising a transformer having a secondary winding connected to the motor control winding, control means selectively to produce in the secondary winding currents of reversed phases, a pair of reversely poled rectifiers connected in series across the control winding, an impedance connecting the point between the rectifiers to the mid-point of the transformer secondary winding, and an electron discharge tube controlled by the voltage drop across the impedance and connected to one of the motor windings to produce a braking current therein when there is no flow of current through the impedance.

5. A control circuit comprising a reversible motor having a main winding and a control winding, a movable pointer, means responsive to a condition to be measured to move the pointer, a lever movable adjacent to the pointer and connected to the motor to be moved thereby, a transformer having a primary winding and a secondary winding connected to the motor control winding, an energizing circuit for the primary winding to induce voltages of reversed phase in the secondary winding, control elements in the energizing circuit connected to the pointer and the lever respectively to control by their relative positions the effective energizing voltage in the primary winding, a pair of reversely poled rectifiers connected in series across the secondary winding, an impedance connecting the point between the rectifiers to the mid-point of the secondary winding, and an electron discharge tube controlled by the voltage drop across the impedance and connected to one of the motor windings to produce a braking current in the motor winding when there is no flow of current through the impedance.

6. A control circuit comprising a reversible motor having a main winding and a control winding, a movable pointer, means responsive to a condition to be measured to move the pointer, a lever movable adjacent to the pointer and connected to the motor to be moved thereby, a transformer having a primary winding and a secondary winding connected to the motor control winding, an energizing circuit for the primary winding to induce voltages of reversed phase in the secondary winding, control elements in the energizing circuit connected to the pointer and the lever respectively to control by their relative positions the effective energizing voltage in the primary winding, a pair of reversely poled rectifiers connected in series across the secondary winding, an impedance connecting the point between the rectifiers to the mid-point of the secondary winding, and an electron discharge tube connected across the motor main winding and controlled by the voltage drop across the impedance.

7. A control circuit comprising a reversible motor having a main winding and a control winding, a movable pointer, means responsive to a condition to be measured to move the pointer, a lever movable adjacent to the pointer and connected to the motor to be moved thereby, a transformer having a primary winding and a secondary winding connected to the motor control winding, an energizing circuit for the primary winding to induce voltages of reversed phase in the secondary winding, control elements in the energizing circuit connected to the pointer and the lever respectively to control by their relative positions the effective energizing voltage in the primary winding, a pair of reversely poled rectifiers connected in series across the secondary winding, an impedance connecting the point between the rectifiers to the mid-point of the secondary winding, a condenser in series with the motor main windings, and an electron discharge tube controlled by the voltage drop across the impedance and connected across the condenser.

ROBERT T. NAKASONE.

References Cited in the file of this patent

UNITED STATES PATENTS

| Number | Name | Date |
|---|---|---|
| 2,297,187 | Johnson | Sept. 29, 1942 |
| 2,489,689 | Wald | Nov. 29, 1949 |
| 2,508,639 | Field | May 23, 1950 |
| 2,519,043 | Greenwood et al. | Aug. 15, 1950 |
| 2,538,494 | Barton | Jan. 16, 1951 |
| 2,574,837 | Mouzon | Nov. 13, 1951 |
| 2,600,170 | Robinette | June 10, 1952 |